United States Patent [19]

Lindl

[11] 3,801,264

[45] Apr. 2, 1974

[54] DEHYDRATING SYSTEM WITH EXHAUST GAS RECYCLING

[75] Inventor: Gordon J. Lindl, Milwaukee, Wis.

[73] Assignee: The Heil Company, Milwaukee, Wis.

[22] Filed: Apr. 24, 1972

[21] Appl. No.: 246,530

[52] U.S. Cl.................... 432/37, 34/131, 34/136
[51] Int. Cl......................... F27b 7/00, F26b 11/04
[58] Field of Search.......... 432/37, 41; 34/131, 136

[56] References Cited
UNITED STATES PATENTS

| | | | |
|---|---|---|---|
| 2,715,283 | 8/1955 | Halldorsson | 34/136 X |
| 2,720,710 | 10/1955 | Erisman | 34/136 X |
| 3,538,614 | 11/1970 | Weimer et al. | 34/131 |

Primary Examiner—John J. Camby
Attorney, Agent, or Firm—Arthur L. Morsell, Jr.

[57] ABSTRACT

A furnace having a burner at one end and having air openings adjacent to the burner is coupled at its other ends to a rotary drum dryer for alfalfa or other moist products which are to be dried. A fan is coupled to the outlet end of the dryer to draw the moist product and the hot gases from the furnace through the dryer. A centrifugal cyclonic collector is coupled to the outlet of the fan, and a significant portion of the exhaust gases from the collector is recycled to a hood which covers the burner and air openings at an end of the furnace. The recycled exhaust gases provide substantially all of the drying medium for the dryer.

5 Claims, 6 Drawing Figures

DEHYDRATING SYSTEM WITH EXHAUST GAS RECYCLING

BACKGROUND OF THE INVENTION

This invention relates to dehydrators used for drying material such as hay, alfalfa, brewers' or distillers' grains, fish meal, citrus wastes, animal manure, wet corn milling byproducts, and forest products such as for the particle board industry where the exhaust gases contain both particulate matter and air pollutants in gaseous form, there usually being air pollution and odor problems in connection with such dehydrating operations.

In the past it has been proposed to recycle a portion of the exhaust gases from such dehydrators through the furnaces thereof to incinerate the particulate matter and gaseous pollutants in the exhaust gases. In these prior art dehydrator systems, however, the exhaust gases which were recycled through the furnace were applied downstream of the burner, it being the common belief that the application of wet, oxygen-poor exhaust gases upstream of the burner would retard combustion and have a detrimental affect on the drying operation. In accordance with this invention, however, it has been discovered that superior results can be obtained by returning the recycled exhaust gases upstream of the burner. This results in more complete incineration of the particulate matter and gaseous pollutants without adversely affecting the combustion of fuel by the burner.

Accordingly, the principal object of this invention is to provide a dehydrator having an exhaust recycling system which is more effective in disposing of exhaust pollutants and particulate matter.

A further object of this invention is to provide a dehydrator having an exhaust recycling system in which substantially all of the drying medium supply for the dryer is supplied by recycled exhaust gases.

An additional object of this invention is to provide a dehydrator having an exhaust recycling system in which the recycled exhaust gases are applied upstream of the burner, being recycled to a hood covering an end of the furnace and covering the burner and the air openings between the burners.

Another object of this invention is to provide a dehydrator of the above-noted character which is relatively simple in structure and reliable in operation.

Yet another object of this invention is to provide a dehydrator of the above-noted character which is relatively efficient in operation.

SUMMARY OF THE INVENTION

In accordance with this invention, the above-noted objects are attained by providing a dehydrator system having a furnace with a burner at one end thereof and air openings in said end adjacent to the burner. A hood covers the end of the furnace and encloses the burner and the air openings therefor. A substantial portion of the exhaust gases from the dehydrator system are recycled to the hood where they pass through the air openings which are adjacent to the burner and provide drying medium for the dryer. The vapor (steam) contained therein super heats and thus provides a relatively inert but improved drying medium.

DETAILED DESCRIPTION OF THE INVENTION

Figure 1:
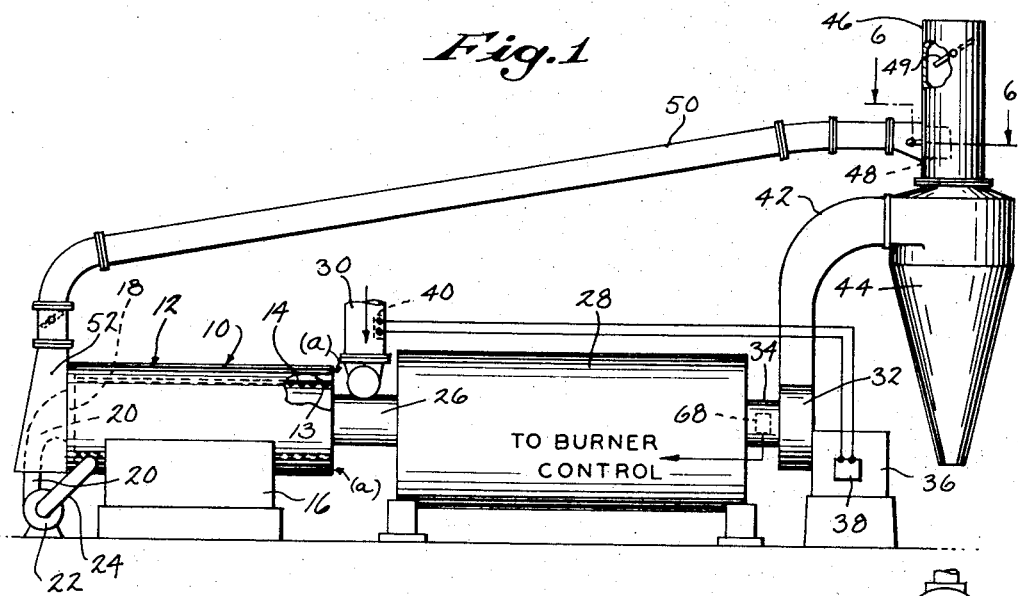
FIG. 1 is a side elevational view of one illustrative dehydrator system of this invention.

Referring to FIG. 1, a furnace 10 having an outer wall 12 and an inner wall 14 is supported upon a base 16, there being a jacket space 13 between the inner and outer walls. A burner 18 is mounted on one end of the furnace and primary combustion air is applied to the burner 18 through an air inlet duct 20 from a blower 22. The inlet air for the blower 22 can be taken from the ambient atmosphere if desired, but it is preferable to draw the inlet air for the blower 22 from the jacket space 13 between the outer wall 12 of the furnace 10 and the inner wall 14 thereof. This preheats the inlet air and provides a useful outlet for heat which would otherwise be wasted as radiation from the walls of the furnace. Accordingly, it is preferable to couple a duct 24 between the inlet of the blower 22 and the outer wall 12 of the furnace to conduct this preheated air into the blower 22. Suitable air inlet openings are provided in the outer wall 12 of furnace 10 to admit fresh air into the space 13 between outer wall 12 and the inner wall 14 as indicated by the arrows (a) in FIG. 1.

The outlet end of the furnace 10 is coupled by means of a duct 26 to the inlet end of a rotary drum dryer 28. The duct 26 has a feed duct 30 coupled thereto for receiving the wet product to be dried. The ducts 26 and 30 are coupled together by well-known prior art means which includes an air seal for preventing cold air from being drawn into dryer 28 from the feed duct 30.

A fan 32 is coupled to the outlet of the rotary drum dryer 28 by means of an outlet duct 34. The fan 32 is driven by an electric motor 36 which, in its simplest form, operates at a constant speed, to provide a constant volume delivery.

In the preferred embodiment of the invention, the speed of the motor 36 is controlled in accordance with the amount of moisture present in the moist product input. This is determined by a moisture sensor 40 which is mounted in the feed duct 30. The moisture sensor 40 continuously senses the relative amount of moisture in the product being inserted into the feed duct 30 and develops an electrical output signal which is proportional to the amount of moisture in the product. This electrical signal is applied to the control circuit 38 which speeds up the motor 36 when the moisture content in the product increases and slows it down when the moisture content in the product decreases.

The outlet of the fan 32 is connected through an outlet duct 42 to a centrifugal cyclonic collector 44. The dried product and hot gases that pass through the duct 42 are introduced tangentially into the collector 44 where they swirl around in a cyclone with the dried product falling to the bottom under the influence of gravity and falling out of the open bottom of the collector, the gases being discharged through a stack 46 which is coupled to the top of the collector.

A tangential skimmer with damper 48 is preferably placed within the stack 46 to skim off and withdraw a peripheral layer of swirling effluent containing dust particles and exhaust gases and direct them into a recycling duct 50. Another damper 49 is mounted within stack 46 above damper 48. In normal operating condition, damper 49 is set in a near wide open position for the purpose of balancing the collector 44, and the skimmer damper 48 is set in a maximum open position so as to insure the maximum possible recirculation, the damper 48 being adjustable as illustrated.

Figure 2:
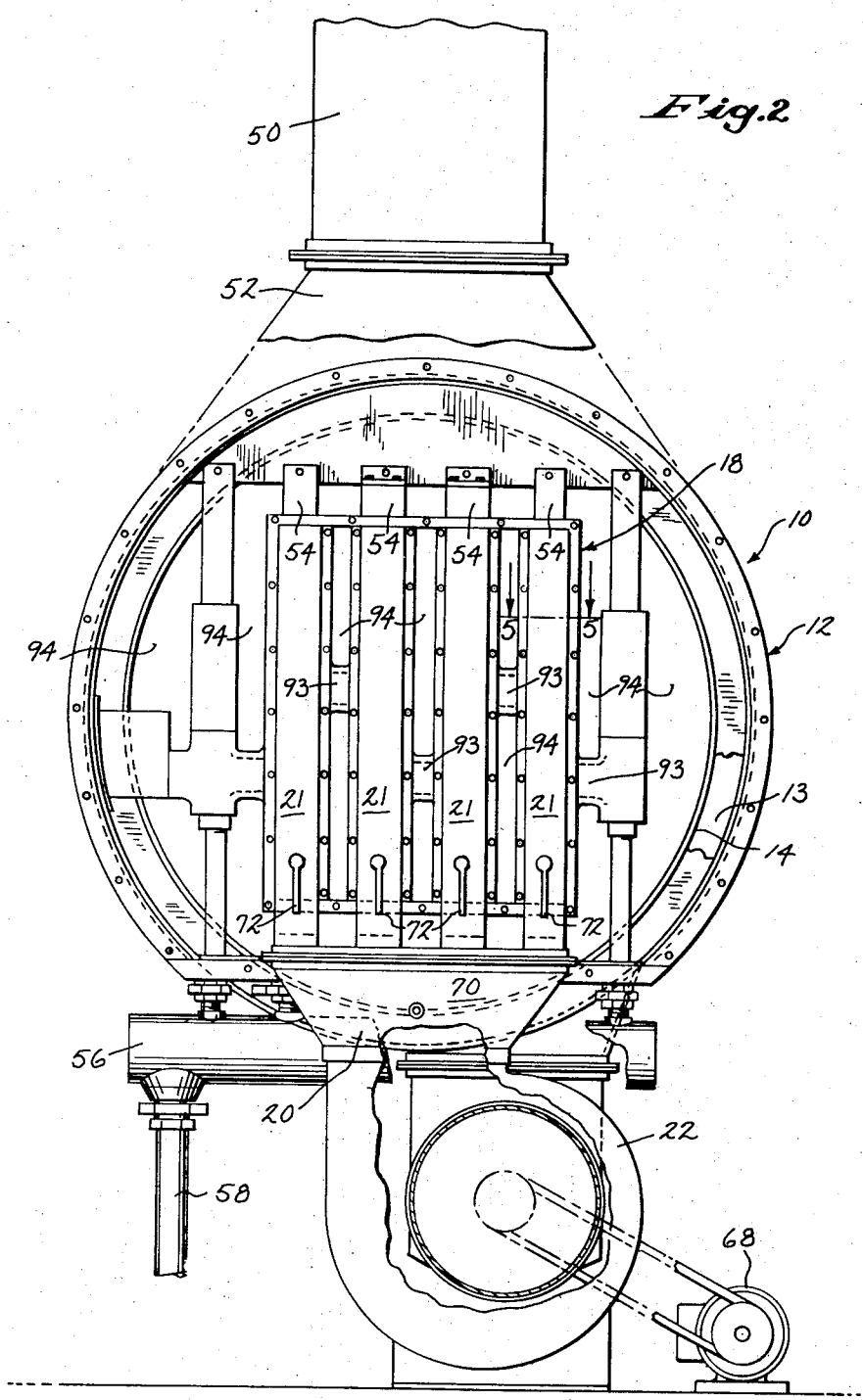
FIG. 2 is an enlarged end view showing the burner construction for the embodiment shown in FIG. 1, the hood being broken away.
Figure 3:
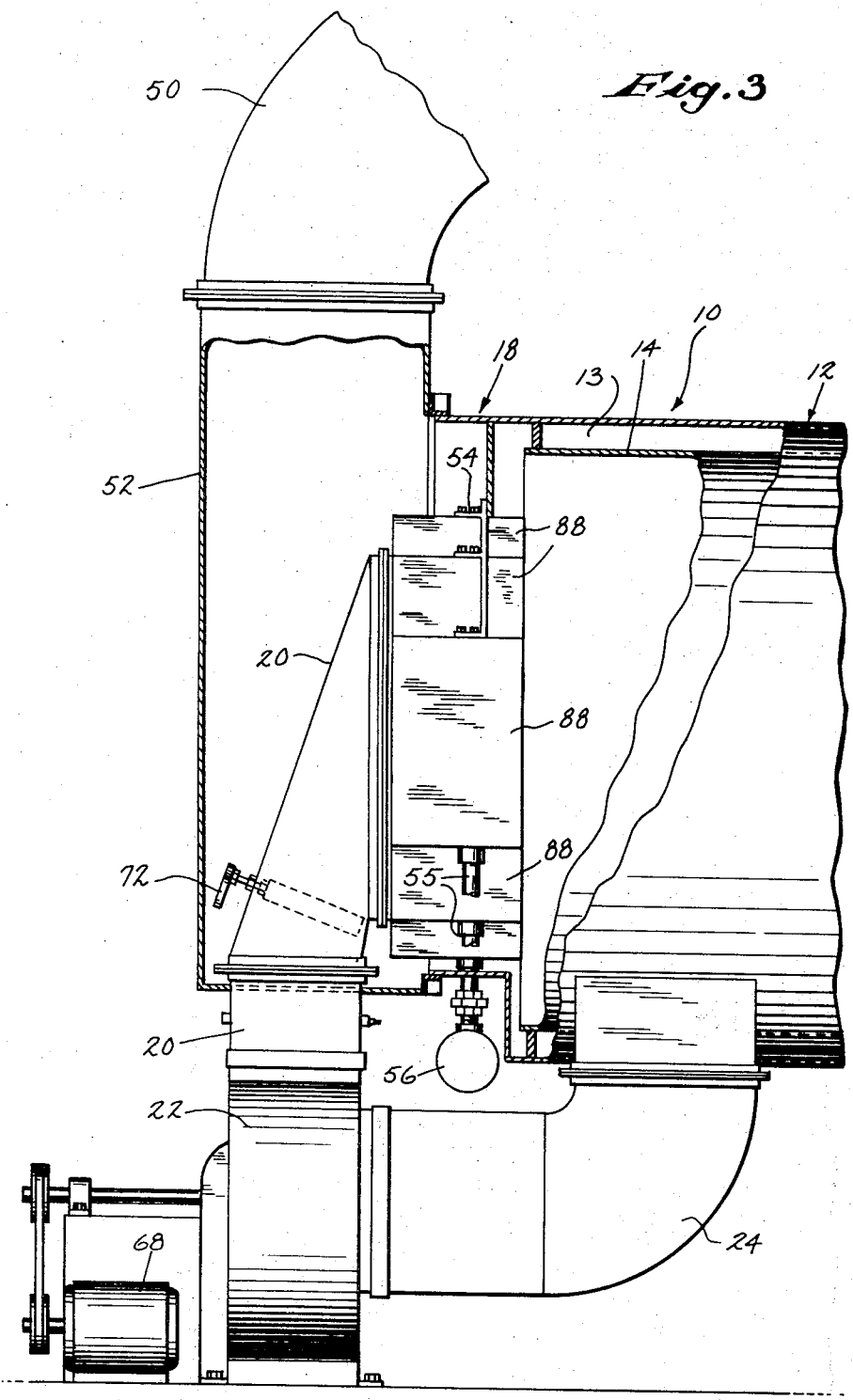
FIG. 3 is a side elevational view of the burner structure shown in FIG. 2, parts being broken away and shown in section.

Recycling duct 50 is coupled between the exhaust stack 46 and a hood 52 which covers the burner 18 and the air openings 94 which are adjacent to the burner 18 and the elements thereof as shown in FIG. 2.

Figure 4:
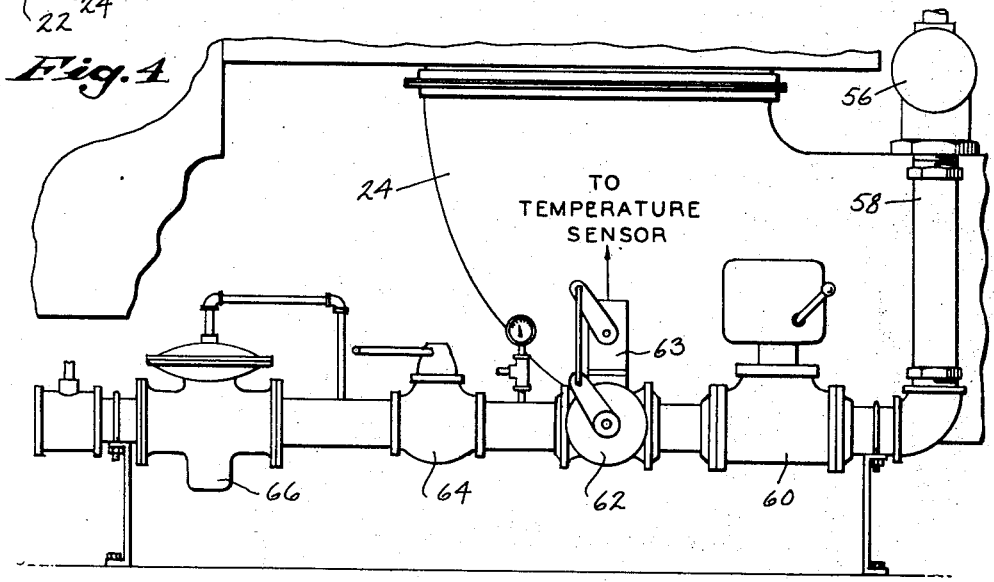
FIG. 4 is an enlarged detail view of a gas inlet conduit for the burner shown in FIGS. 2 and 3.
Figure 6:
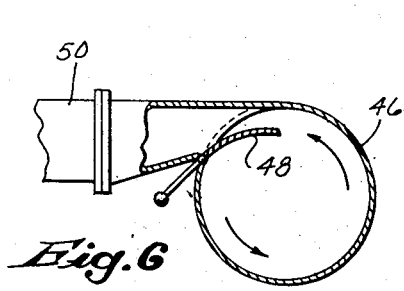
FIG. 6 is a detail sectional view taken on the line 6—6 of FIG. 1.

FIGS. 2 through 5 show the detailed construction of the burner 18 and its associated air supply and fuel supply systems. In this particular embodiment of the invention the burner is a gas burner comprising a plurality of burner elements 54 (FIG. 2) which are coupled through conduits 55 to a gas manifold 56 which receives gas under pressure through a flexible conduit 58. Referring to FIG. 4, gas under pressure is delivered to the flexible conduit 58 through a solenoid safety valve 60, an automatic throttling valve 62, a manual shut-off valve 64, and a pressure regulator 66. The throttling valve 62 is operated by an electrical control circuit 63 which is electrically coupled to a temperature sensor 68 (see FIG. 1) which is installed in the outlet duct 34 from the rotary drum dryer 28. The control circuit 63 for the throttling valve 62 is adapted to maintain a constant temperature at the outlet of the rotary drum dryer 28 by increasing the supply of gas to the burner when the temperature at the temperature sensor 68 drops, and by decreasing the amount of gas supplied to the burner when the temperature at the temperature sensor 68 increases. Thermostatic controls of this type are well known to those skilled in the art and any suitable thermostatic control can be used in connection with the throttling valve 62.

Referring to FIG. 2, the primary combustion air for the burners 54 is supplied by means of a blower 22 which is driven by an electric motor 68 and whose output air is coupled by means of a plenum chamber 70 to a group of primary air inlet ducts 21. Each of the primary air inlet ducts 21 has a damper 72 by means of which the volume of the air flow therethrough can be controlled by manual setting.

Figure 5:
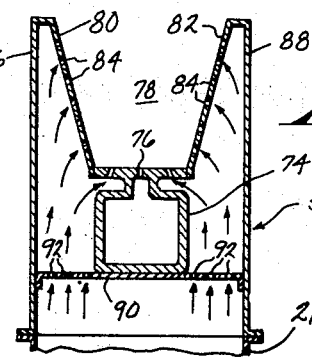
FIG. 5 is a detail sectional view taken on the line 5—5 of FIG. 2.

FIG. 5 shows a detail cross-sectional view of one of the burners 54. The burner has a central channel 74 for conducting the gas to be burned. The gas leaves the channel 74 through openings 76 which are spaced along the length thereof. A combustion chamber 78 extending forwardly from the openings 76 is defined by side wall members 80 and 82 which contain openings 84 therein through which primary air is introduced into the combustion chamber. The inner side walls 80 and 82 are joined to outer side walls 86 and 88 which in turn are joined to the air inlet duct 21. The gas duct 74 is enclosed on its rear surface by a partition plate 90 which extends between the outer walls 86 and 88 and has openings 92 therein to allow the primary air to diffuse and flow through. As noted above, the amount of primary air flowing through the openings into the combustion zone 78 can be controlled by means of the manual damper adjustment 72.

The individual burners 54 are laterally spaced apart across the front of the furnace to leave air spaces 94 between and adjacent the burners through which drying medium can enter into the combustion zone of the furnace. This drying medium is, however, restricted to the recycled exhaust gases delivered by the duct 50. This is accomplished by sealing the entire end of the furnace over with the closed bottom hood 52 which covers the burners 54, the air spaces 94, and the primary air inlet ducts 21. This completely seals off the front of the furnace and allows only the air from the plenum 70 to enter therein, in addition to the exhaust gases from the exhaust recycling duct 50. Since the recycled exhaust gases enter the system upstream of the burners, and provide substantially all of the drying medium entering into the combustion zone through the spaces 94 adjacent to and between the burners, the particulate matter and pollutant gases contained in the exhaust are more completely incinerated and disposed of than they would be if the exhaust gases were applied downstream of the burners.

From the foregoing description it will be clear that this invention provides a dehydrator having an exhaust recycling system which is more effective in disposing of exhaust pollutants and particulate matter. And although this invention has been described in connection with one specific embodiment thereof, it should be understood that the invention is by no means limited to the disclosed embodiment since many modifications can be made in the disclosed structure without altering its essential principles. For example, although a gas burner has been utilized in the disclosed embodiment of the invention, it will be clear to those skilled in the art that an oil burner could be used if desired in place of the gas burner. In addition, a negative fan or pull-through system may be employed wherein collector 44 is located between drum 28 and fan 32. These and many other modifications of the disclosed structure will be apparent to those skilled in the art, and this invention includes all such modifications as may fall within the scope of the following claims.

What I claim is:

1. In a dehydrating system having a furnace with a burner at one end thereof, there being air openings in said end of the furnace adjacent to said burner, said system having dryer means for directing heated air over a product to be dried and having exhaust means for conducting exhaust gases away from the dried product, the improvement comprising a hood over said burner and air openings, said hood closing said end of the furnace, and means for conducting a substantial portion of said exhaust gases from said exhaust means to said hood for passage through said air openings to provide drying medium for said dryer means, said burner containing a plurality of individual burner elements which are mounted at said one end of the furnace in spaced-apart relationship within said hood, and said air openings including the spaces between said individual burner elements.

2. In a dehydrating system having a furnace with a burner at one end thereof, there being air openings in said end of the furnace adjacent to said burner, said system having dryer means for directing heated air over a product to be dried and having exhaust means for conducting exhaust gases away from the dried product, the improvement comprising a hood over said burner and air openings, said hood closing said end of the furnace, means for conducting a substantial portion of said exhaust gases from said exhaust means to said hood for passage through said air openings to provide drying medium for said dryer means, said dryer means including a rotary drum dryer having a feed chamber coupled to one end thereof and having an electric fan coupled to the other end, and further comprising a moisture sensor element mounted in said feed chamber, and there being means coupled between said moisture sensor element and electric fan for increasing the speed of said fan in response to an increase of moisture in said feed chamber and for decreasing the speed of said fan in response to a decrease of moisture in said feed chamber.

3. A dehydrating system as claimed in claim 1 and further comprising fuel feed means for said burner, a throttling valve coupled between a source of fluid fuel and said burner, a temperature sensing element mounted within said dryer means, means coupled between said temperature sensing element and said throttling valve for increasing the flow of fuel through said throttling valve in response to a drop in temperature in said dryer means and for decreasing the flow of fuel through said throttling valve in response to rise in temperature.

4. In a dehydrating system having a furnace with a burner at one end thereof, there being air openings in said end of the furnace adjacent to said burner, said system having dryer means for directing heated air over a product to be dried and having exhaust means for conducting exhaust gases away from the dried product, the improvement comprising a hood over said burner and air openings, said hood closing said end of the furnace, and means for conducting a substantial portion of said exhaust gases from said exhaust means to said hood for passage through said air openings to provide drying medium for said dryer means, said burner containing a plurality of individual burner elements which are mounted at said one end of the furnace in spaced-apart relationship within said hood, and said air openings including the spaces between said individual burner elements, the exhaust gases which are conducted to the hood for passage through said air openings providing all of the secondary drying air for the dryer means.

5. In a dehydrating system having a furnace with a gas burner at one end thereof, there being air openings in said end of the furnace adjacent to said burner, said system having dryer means for directing heated air over a product to be dried and having exhaust means for conducting exhaust gases including particulate matter away from the dried product, the improvement comprising a hood over said burner and air openings, said hood closing said end of the furnace, means for conducting a substantial portion of said exhaust gases including vapors from said exhaust means to said hood for passage through said air openings of said gas burner in a position for efficient incineration of particulate matter and to provide drying medium for said dryer means, and air seal type feed means for introducing the wet product to the dryer, all entry of air to the dryer and furnace being excluded by said hood except burner combustion air, whereby the recycled gases from said exhaust means provide substantially all of the drying medium for said dryer means.

* * * * *